(12) United States Patent
Lee et al.

(10) Patent No.: US 7,048,401 B2
(45) Date of Patent: May 23, 2006

(54) METHOD AND APPARATUS FOR DIRECTING LIGHT TO A DISPLAY AND OTHER FEATURES IN A DEVICE

(75) Inventors: Kevin Lee, San Jose, CA (US); Shawn R. Gettemy, San Jose, CA (US); Sherridythe A. Fraser, San Jos, CA (US); William R. Hanson, Mountain View, CA (US); Yoon Kean Wong, Redwood City, CA (US)

(73) Assignee: Palm, Inc., Milpitas, CA (US)

( * ) Notice: Subject to any disclaimer, the term of this patent is extended or adjusted under 35 U.S.C. 154(b) by 219 days.

(21) Appl. No.: 10/346,619

(22) Filed: Jan. 17, 2003

(65) Prior Publication Data
US 2004/0141335 A1 Jul. 22, 2004

(51) Int. Cl.
*F21V 33/00* (2006.01)

(52) U.S. Cl. ............................ 362/85; 362/84; 362/555
(58) Field of Classification Search ................ 362/84, 362/85, 551, 552, 554, 555, 558, 559, 561, 362/576, 582
See application file for complete search history.

(56) References Cited

U.S. PATENT DOCUMENTS

| | | | | |
|---|---|---|---|---|
| 4,422,719 A | * | 12/1983 | Orcutt | 362/551 |
| 4,912,605 A | * | 3/1990 | Whitehead | 362/558 |
| 5,097,396 A | * | 3/1992 | Myers | 362/551 |
| 6,422,712 B1 | * | 7/2002 | Nousiainen et al. | 362/555 |
| 6,776,497 B1 | * | 8/2004 | Huppi et al. | 362/85 |
| 2003/0123261 A1 | * | 7/2003 | Muthu et al. | 362/561 |

OTHER PUBLICATIONS

Lumitex Inc.—Illumination Solutions, 8 pps., retrieved from the Internet web site: http://www.lumitex.com.
Poa Sana Touch Sensor Technology, 8 pps., retrieved from the Internet web site: http://www.poasana.com.

* cited by examiner

Primary Examiner—Y. My Quach-Lee
(74) Attorney, Agent, or Firm—Foley & Lardner LLP

(57) ABSTRACT

A lighting system for a portable electronic device or handheld computer is disclosed. In one embodiment, the lighting system includes a light source coupled to a light distributing element. The light distributing element is coupled to a phosphorescent material. The phosphorescent material is coupled to a display and/or input device. The light source pulses on and off to maintain light at a display and/or input device.

15 Claims, 5 Drawing Sheets

METHOD AND APPARATUS FOR DIRECTING LIGHT TO A DISPLAY AND OTHER FEATURES IN A DEVICE

BACKGROUND

The invention relates generally to the field of portable electronic devices and handheld computers. More particularly, the invention relates to portable electronic devices and handheld computers including lighting systems. Further, the invention relates to portable electronic devices and handheld computers including lighting systems used to light displays and/or input devices.

Conventionally, portable electronic devices include visible displays, such as liquid crystal displays (LCDs) and other similar displays. Such displays may be incorporated into any of a variety of portable electronic devices, such as mobile telephones, handheld computers, personal digital assistants (PDAs), laptop computers, and the like. Because of the small form factor required for such portable electronic devices, many conventional portable electronic devices also include some integrated types of input devices, for example, touch screens, buttons, thumb wheels (joy dials), integrated keyboards, and the like. To make the displays easier to read and the input devices easier to locate and use, especially in poor lighting conditions, many devices incorporate lighting systems to light the displays and the input devices.

Because there is a desire for very thin, lightweight, and power conserving lighting systems, and further because there is a desire to have displays and input devices on the portable electronic device that are easy to see in poor lighting conditions, conventional lighting systems may not be satisfactory.

Accordingly, there is a need for a lighting system that can provide light to displays and input devices and may be integrated into the housing of a portable electronic device. Further, there is a need for a lighting system that uses less power than conventional lighting systems to extend battery life. Further still, there is a need for a lighting system that uses a single light source. Yet further still, there is a need for a lighting system that can light a display and one or more input devices from a single light source.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An example of the invention relates to a lighting system having a light source. The light source is coupled to a power source. The lighting system also includes a light distributing element coupled to the light source. Further, the lighting system includes a phosphorescent material coupled to the light distributing element. The light source pulses on and off at a duty cycle when the lighting system is activated to maintain light at the phosphorescent material.

Another example of the invention relates to a method for lighting parts of a portable device. The method includes using a single light source coupled to a power source and directing the light to a display through a light distributing element. The method also includes using the same light source to light an input device (e.g. button, keypad, toggle switch, sensor) through another light distributing element.

Yet another example of the invention relates to a lighting system for a portable device. The lighting system includes a single LED. The lighting system also includes a first fiber optic conduit coupled to the LED and a second fiber optic conduit coupled to the LED. Further, the lighting system includes a light guide of a display coupled to the first fiber optic conduit. Further still, the lighting system includes an input device coupled to the second fiber optic conduit and a phosphorescent material configured to absorb light energy from at least one of the first light guide of the display and the input device.

Yet still another example of the invention relates to a handheld computer. The handheld computer includes computing electronics, a display, and a housing supporting the display. The handheld computer also includes a first input device, a second input device, a light source, and a power supply coupled to the light source. Further, the handheld computer includes a first light distributing element coupled to the light source and the first input device and a second light distributing element coupled to the light source and the second input device.

Alternative examples of the invention relate to other features and combination of features as may be generally recited in the claims.

BRIEF DESCRIPTION OF THE DRAWINGS

The invention will become more fully understood from the following detailed description taken in conjunction with the accompanying drawings, wherein like reference numerals refer to like elements in which.

DETAILED DESCRIPTION OF PREFERRED AND EXEMPLARY EMBODIMENTS

Figure 1A:
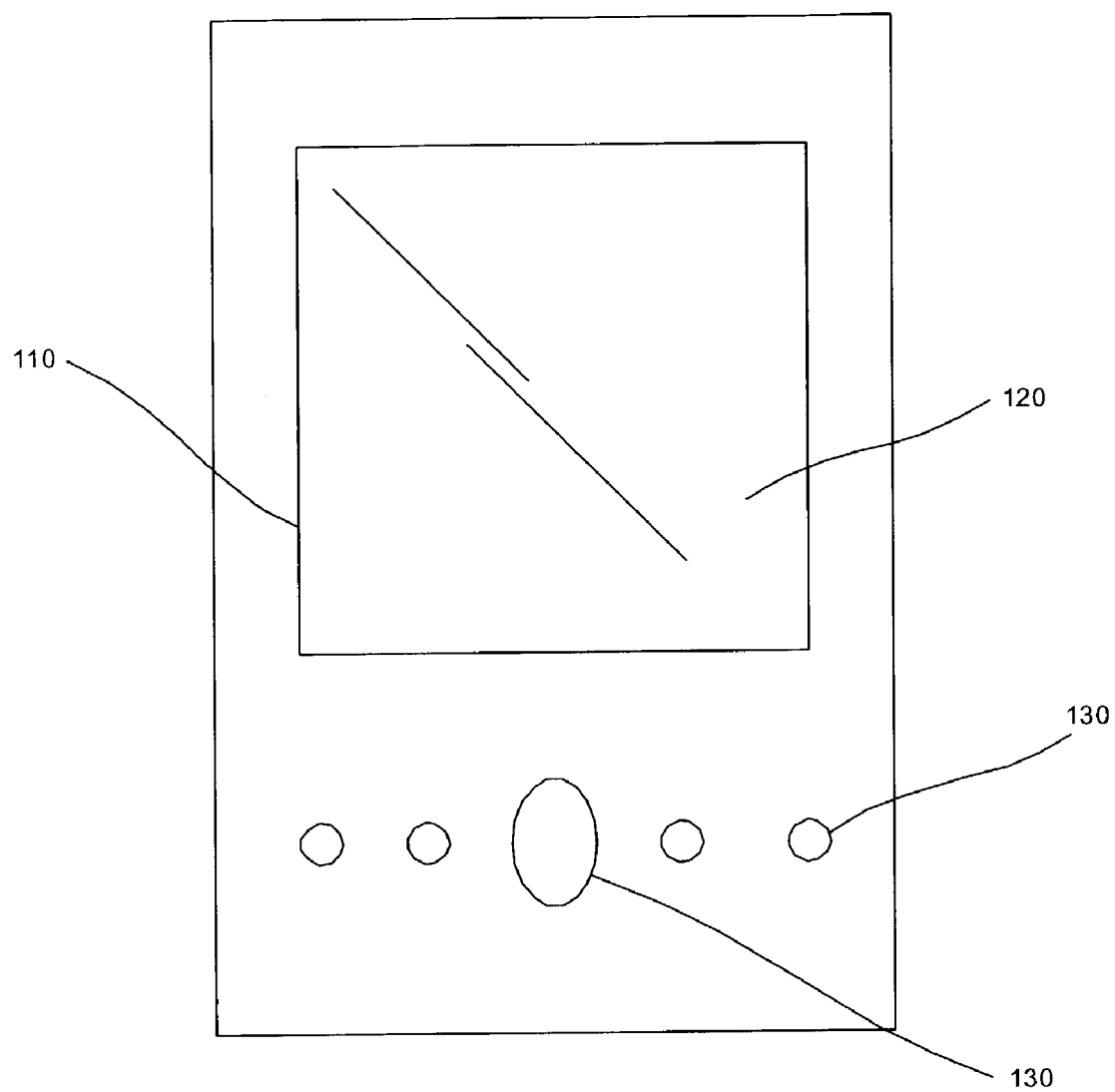
FIG. 1A is an exemplary depiction of a handheld computer.

Shown in FIG. 1A, is an exemplary embodiment of a handheld computer or portable computer 100. Handheld computer system 100 is representative of many of the portable electronic devices in which embodiments of the invention may be implemented, including, but not limited to personal digital assistants (PDAs), personal information managers (PIMs), palm tops, handheld computers, cellular telephones, wireless communicators, and other information and data processing devices. Handheld computer 100 includes a lighting system 200 depicted in FIG. 2, supported by a housing 110. The lighting system is used to provide light to a display 120 and to one or more input devices (e.g. switches and buttons) 130. Display 120 may also include any indicators on the device that relay information to the user of the device, including, but not limited to battery life indicators, power on/off indicators, and other status indicators, icons, and application buttons, as well as other graphical user interface elements.

Figure 1B:
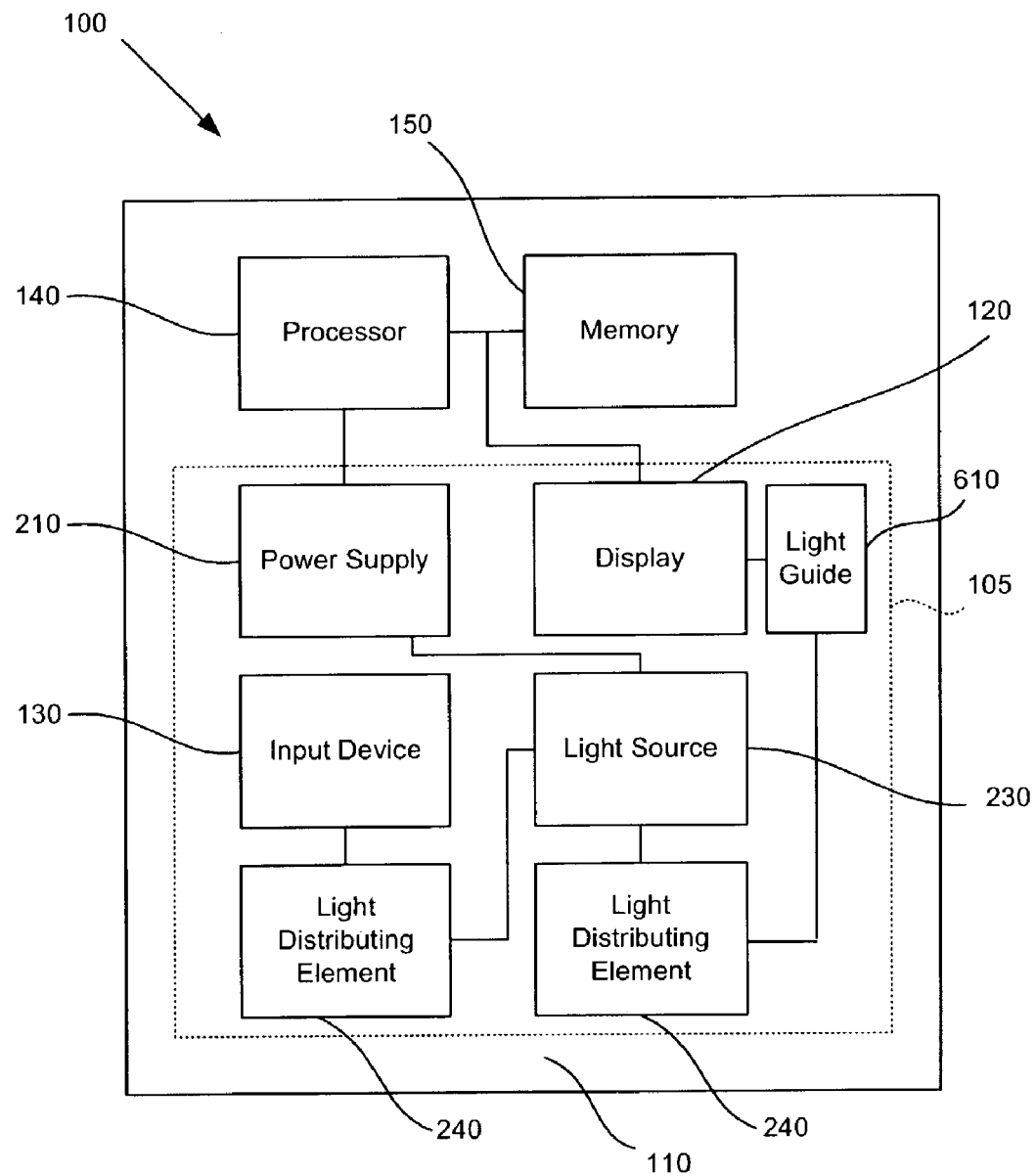
FIG. 1B is an exemplary block diagram of a handheld computer with a lighting system.

FIG. 1B depicts an exemplary block diagram of handheld computer 100 including a lighting system 105. Handheld computer 100 includes a housing 110, a processor 140, and memory 150. Handheld computer 100 also includes a power supply 210 coupled to a light source 230. Light source 230 is used to provide light to light distributing elements 240. Light distributing elements 240 may provide light to one of or both a display 120 and an input device 130.

Many conventional handheld computers do not have lighted input devices due to the need for requiring multiple light sources, such as multiple LEDs residing beneath each button and/or input device, thereby requiring excessive power consumption. This lack of lighting for input devices may make it difficult for a person to use the device in poor lighting conditions. In conventional handheld computers, however, if the input devices are lighted, each input device usually requires its own separate light source for lighting. The additional light sources require more power and therefore reduce battery life. By using a single light source to light both a display and one or more input devices, no additional power will be needed. Further, if the light source may be cycled at a low duty cycle while still providing a steadily lit appearance, power may also be conserved. Accordingly, battery life is extended and use of the device in poor lighting conditions is simplified.

Figure 2:
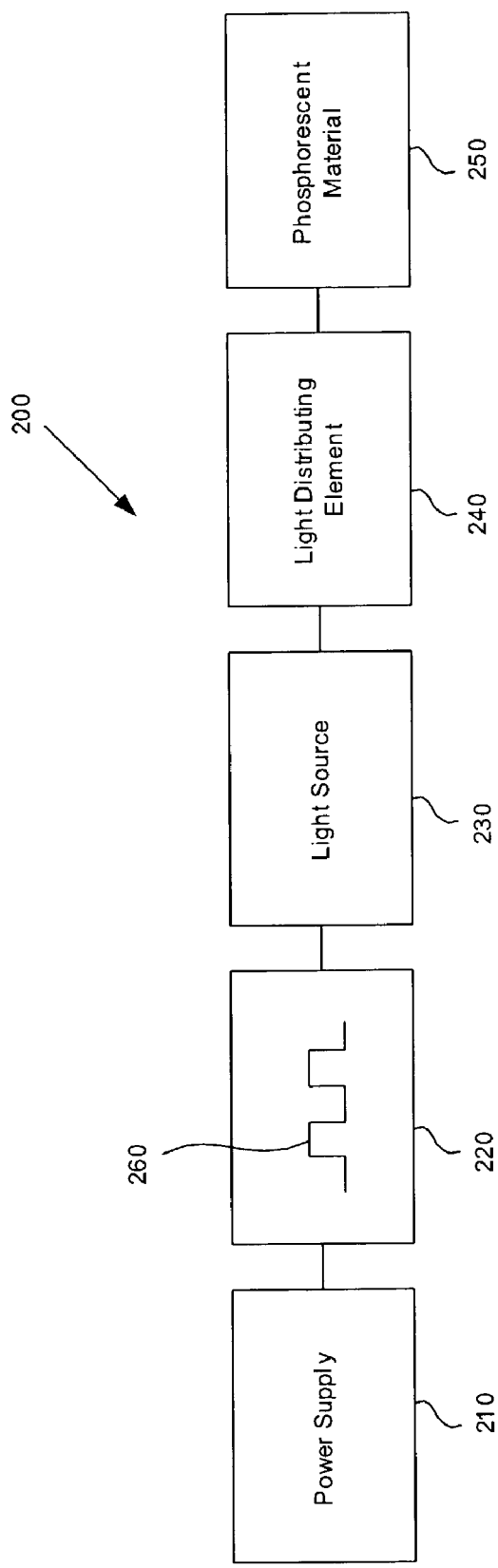
FIG. 2 is an exemplary block diagram of a lighting system for a portable device.

Lighting system 200 as depicted in FIG. 2, includes a power supply 210 coupled to a pulsing control 220. The pulsing control is used to cycle power on and off to a light source 230 at a duty cycle 260. The pulsing control 220 may be implemented using hardware or software and the waveform used could vary. The light source 230 is coupled to a light distributing element 240, which in turn is coupled to a phosphorescent material 250. The phosphorescent material 250 may include, but is not limited to, zinc sulfide with copper as an activator and strontium aluminate with europium as an activator. The phosphorescent material 250 may alternatively be any material capable of absorbing energy when in contact with a light source and then releasing that energy in the form of light over time when the light source is removed. The light distributing element 240 may consist of, but is not limited to, a fiber optic pipe or a wave guide or anything capable of transmitting light from a light source to a target destination such as a fiber optic conduit.

Pulsing light source 230 used in conjunction with the phosphorescent material will provide continuous light at display 120 and input devices 130 when the lighting system is enabled, even when light source 230 is in the part of the duty cycle where the light source is turned off. Although light source 230 could be on constantly, pulsing of light source 230 on and off to maintain light at the display 120 and/or input devices 130 acts to conserve power. Conventional lighting systems use a steady stream of light and do not pulse a light source on and off. By requiring that the light source be on constantly when light is desired at a display or an input device, conventional lighting systems drain more power as compared with a system utilizing a pulsed light source.

Figure 3:
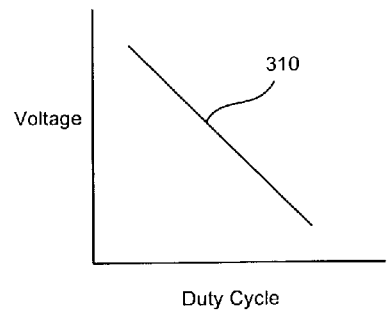
FIG. 3 is an exemplary graph of duty cycle versus voltage.

In an exemplary embodiment, duty cycle 260 is proportional to the voltage applied to light source 230 as depicted generally in FIG. 3. As the duty cycle increases, the voltage required for maintaining light at the display 120 and/or input devices 130 increases (this increase may or may not be in a strictly linear relationship). It may be desirable to determine the point on curve 310 which optimizes power conservation and adequate light output.

Figure 4:
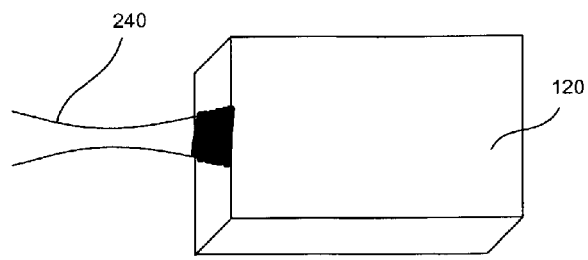
FIG. 4 is an exemplary depiction of a light transmitting element coupled to a display.

Depicted in FIG. 4 is an exemplary embodiment of a fiber optic pipe or wave guide 240 coupled to a display 120. The light transmitted through the fiber optic pipe or wave guide 240 is used to light display 120. The fiber optic pipe or wave guide 240 is configurable to transmit light to any desired location on a device. The fiber optic pipe may be made from any number of materials, including, but not limited to glass or plastic. The wave guide may include, but is not limited to, a film wave guide or a plastic wave guide.

Figure 5:
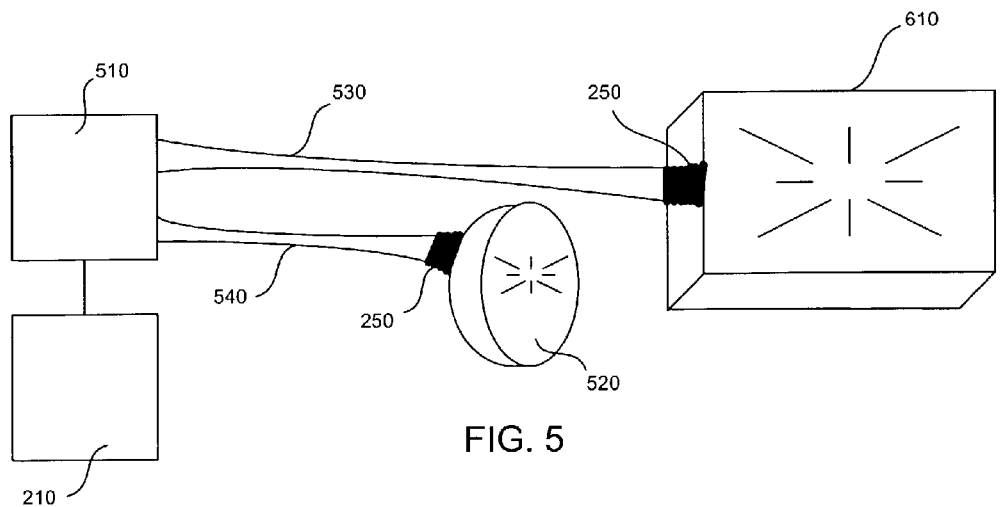
FIG. 5 is an exemplary depiction of a lighting system for a portable device.

FIG. 5 depicts an exemplary embodiment of a lighting system with an LED 510 coupled to a power supply 210 provides light to a display 120 and an input device 520 (e.g. button, keypad, toggle switch, rotary dial, joystick, etc.). Fiber optic pipe 530 transmits light from LED 510 to light guide 610 of the display and/or of the input device. Input device 520 may also be fully or partially coated or composed of a phosphorescent material. Fiber optic pipe 540 may also transmit light from LED 510 to input device 520.

Figure 6:
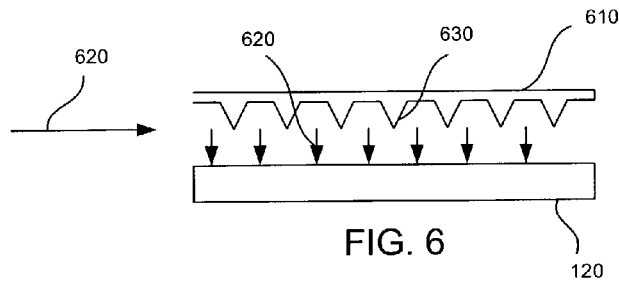
FIG. 6 is an exemplary depiction of a light guide uniformly distributing light across a display.

Depicted in FIG. 6 is an exemplary embodiment of a light guide 610 being used to uniformly distribute light 620 across a display 120. The light guide includes microstructures 630 to direct the light to the display. The light guide 610 could be configured for front or back lighting of the display. Alternatively, other types of light distribution structures may be used without departing from the scope of the invention.

Figure 7:
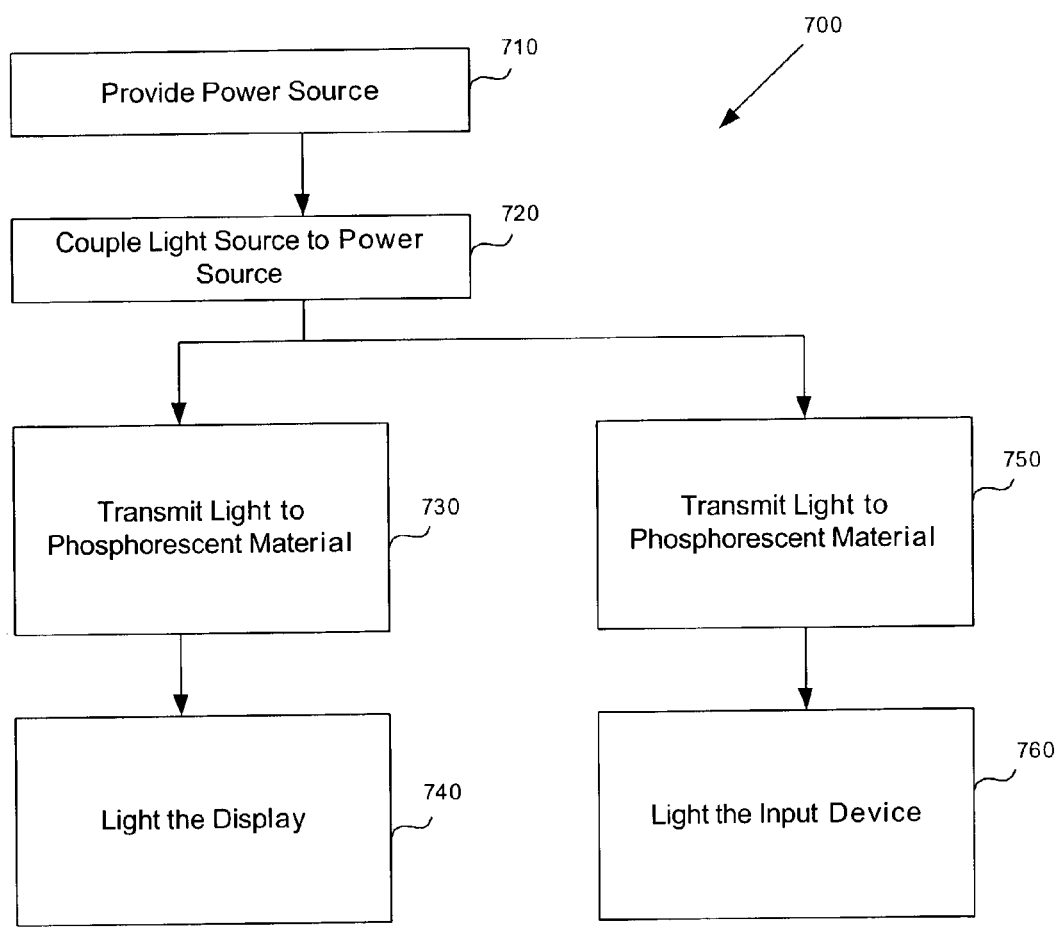
FIG. 7 is an exemplary flowchart of a method for lighting parts of a portable device.

Depicted in FIG. 7 is a flowchart 700 of an exemplary embodiment of a method for lighting parts of a portable device. The method includes providing a single light source coupled to a power supply (operations 710 and 720). The light from the light source is directed to a display through a light distributing element (e.g. fiber optic conduit, fiber optic pipe, wave guide, etc.) (operations 730 and 740). The light from the light source is also directed to an input device (e.g. button) through a light distributing element (operation 760) and illuminating a phosphorescent material. In another embodiment of the method, the light source is pulsed on and off at a duty cycle. The duty cycle can be set at any frequency capable of maintaining light at the desired level on the display and/or input devices. To improve battery conservation, however, it may be desirable to pulse the light source by a duty cycle method (such as pulse width modulation (PWM)) with a frequency which has no perceivable flicker, for example 100 Hz. Providing a phosphorescent material coupled to the light distributing element and the display and/or input device in addition to the current method is desirable for helping to maintain a constant level of light at the display and/or input devices.

While the detailed drawings, specific examples and particular formulations and materials given described preferred exemplary embodiments; they serve the purpose of illustration only. The invention disclosed is not limited to the specific forms shown. For example, the methods may be performed in any of a variety of sequences of steps. The hardware and software configurations shown and described may differ depending on the chosen performance characteristics and physical characteristics of the devices. For example, the type of lighting source and light distributing elements used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A lighting system for a portable device comprising:
a single LED;
a first fiber optic conduit coupled to the LED;
a second fiber optic conduit coupled to the LED;
a light guide of a display coupled to the first fiber optic conduit;
an input device coupled to the second fiber optic conduit; and
a phosphorescent material configured to absorb light energy from at least one of the light guide of the display and the input device.

2. The lighting system of claim 1, wherein the phosphorescent material comprises zinc sulfide.

3. The lighting system of claim 1, wherein the light guide uniformly distributes light across the display.

4. The lighting system of claim 3, wherein the light guide is a film light guide.

5. The lighting system of claim 1, wherein the LED is cycled on and off using a duty cycle method.

6. The lighting system of claim 5, wherein the duty cycle method used acts to improve power conservation.

7. A handheld computer comprising:
computing electronics;
a display;
a housing supporting the display;
a first input device;
a second input device;
a light source;
a power supply coupled to the light source;
a first light distributing element coupled to the light source and the first input device;
a second light distributing element coupled to the light source and the second input device; and
a third light distributing element coupled to the light source and configured to transmit light to the display, wherein the third light distributing element is a fiber optic conduit.

8. The handheld computer of claim 7, wherein the light source is an LED.

9. The handheld computer of claim 7, wherein the first light distributing element and the second light distributing element are one of a fiber optic pipe and wave guide.

10. The handheld computer of claim 7, further comprising:
a first phosphorescent material coupled to the first light distributing element of the first input device; and
a second phosphorescent material coupled to the second light distributing element of the second input device.

11. The handheld computer of claim 10, wherein the first phosphorescent material and the second phosphorescent material comprise zinc sulfide.

12. The handheld computer of claim 10, wherein the light source is pulsed using a duty cycle method.

13. The handheld computer of claim 12, wherein the duty cycle method used acts to improve power conservation.

14. The handheld computer of claim 7, wherein the first input device is a button.

15. The handheld computer of claim 14, wherein the second input device is a button.

* * * * *